US011522935B2

(12) United States Patent
Huang et al.

(10) Patent No.: US 11,522,935 B2
(45) Date of Patent: *Dec. 6, 2022

(54) TECHNIQUES FOR EVALUATING A VIDEO RATE SELECTION ALGORITHM BASED ON A GREEDY OPTIMIZATION OF TOTAL DOWNLOAD SIZE OVER A COMPLETED STREAMING SESSION

(71) Applicant: NETFLIX, INC., Los Gatos, CA (US)

(72) Inventors: Te-Yuan Huang, Campbell, CA (US); Chaitanya Ekanadham, San Francisco, CA (US); Andrew J. Berglund, Palo Alto, CA (US); Zhi Li, Mountain View, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,884

(22) Filed: Dec. 7, 2020

(65) Prior Publication Data

US 2021/0092178 A1 Mar. 25, 2021

Related U.S. Application Data

(63) Continuation of application No. 16/036,606, filed on Jul. 16, 2018, now Pat. No. 10,862,942.

(Continued)

(51) Int. Cl.
*H04L 65/70* (2022.01)
*H04L 43/08* (2022.01)

(52) U.S. Cl.
CPC .............. *H04L 65/70* (2022.05); *H04L 43/08* (2013.01)

(58) Field of Classification Search
CPC .............................. H04L 65/607; H04L 43/08
See application file for complete search history.

(56) References Cited

U.S. PATENT DOCUMENTS 10,237,195 B1\* 3/2019 Karach ................ H04L 65/602
2012/0324123 A1 12/2012 Fox et al.
(Continued)

OTHER PUBLICATIONS

Allman et al., "TCP Congestion Control", RFC 5681 (Draft Standard), Sep. 2009, 18 pages.
(Continued)

*Primary Examiner* — Wing F Chan
*Assistant Examiner* — Billy H Ng
(74) *Attorney, Agent, or Firm* — Artegis Law Group, LLP

(57) ABSTRACT

In various embodiments, a hindsight application computes a total download size for a sequence of encoded chunks associated with a media title for evaluation of at least one aspect of a video streaming service. The hindsight application computes a feasible download end time associated with a source chunk of the media title based on a network throughput trace and a subsequent feasible download end time associated with a subsequent source chunk of the media title. The hindsight application then selects an encoded chunk associated with the source chunk based on the network throughput trace, the feasible download end time, and a preceding download end time associated with a preceding source chunk of the media title. Subsequently, the hindsight application computes the total download size based on the number of encoded bits included in the first encoded chunk. The total download size correlates to an upper bound on visual quality.

20 Claims, 6 Drawing Sheets

Related U.S. Application Data

(60) Provisional application No. 62/676,246, filed on May 24, 2018.

(56) References Cited

U.S. PATENT DOCUMENTS

| | | | | |
|---|---|---|---|---|
| 2013/0179590 | A1* | 7/2013 | McCarthy | H04L 65/80 709/231 |
| 2013/0229915 | A1 | 9/2013 | Parker | |
| 2015/0207743 | A1 | 7/2015 | Zanger et al. | |
| 2016/0225405 | A1 | 8/2016 | Matias et al. | |
| 2016/0366202 | A1* | 12/2016 | Phillips | H04N 21/6373 |
| 2017/0026713 | A1 | 1/2017 | Yin et al. | |
| 2017/0055007 | A1 | 2/2017 | Phillips et al. | |
| 2018/0109799 | A1 | 4/2018 | De Cock et al. | |
| 2018/0324234 | A1* | 11/2018 | Zhao | H04L 65/1083 |
| 2018/0338168 | A1* | 11/2018 | Du Breuil | H04L 65/4084 |

OTHER PUBLICATIONS

Armstrong et al., "The multiple-choice nested knapsack model", Institute for Operations Research and the Management Sciences (INFORMS), 1982, 12 pages.

Balachandran et al. "Developing a Predictive Model of Quality of Experience for Internet Video", In ACM SIGCOMM, Aug. 12-16, 2013, pp. 339-350.

Bampis et al., "Study of Temporal Effects on Subjective Video Quality of Experience", In IEEE Transactions on Image Processing, vol. 26, No. 11, Nov. 2017, pp. 5217-5231.

CPLEX Optimizer I IBM, https://www.ibm.com/analytics/cplex-optimizer, retrieved on Apr. 15, 2020, 8 pages.

Robertson, Steven, "Ultra-High Resolution Playback Visualization and its Applications", URL: https://youtu.be/z4t3P_eoyNo, retrieved on Apr. 15, 2020, 3 pages.

Dobrian et al., "Understanding the Impact of Video Quality on User Engagement", In ACM SIGCOMM, Aug. 15-19, 2011, pp. 362-373.

Gurobi Optimizer, http://www.gurobi.com/, retrieved on Apr. 9, 2020, 18 pages.

Huang et al., "Confused, Timid, and Unstable: Picking a Video Streaming Rate is Hard", In ACM IMC, Nov. 14-16, 2012, 14 pages.

Huang et al., "A Buffer-Based Approach to Rate Adaptation:Evidence from a Large Video Streaming Service", In ACM SIGCOMM, Aug. 17-22, 2014, 14 pages.

Kellerer et al., "1. Introduction", In Knapsack Problems, 2004, pp. 1-14.

Kellerer et al., "10. The multiple-choice knapsack problem", In Knapsack Problems, 2004, pp. 317-347.

Kua et al., "A Survey of Rate Adaptation Techniques for Dynamic Adaptive Streaming Over HTTP", In IEEE communications Surveys and Tutorials, vol. 19, No. 3, 2017, pp. 1842-1866.

Lin et al., "The multiple-choice multi-period knapsack problem", In Journal of the Operational Research Society, 2004, pp. 187-197.

Liu et al., "A Case for a Coordinated Internet Video Control Plane", In ACM SIGCOMM, Aug. 13-17, 2012, pp. 359-370.

Mao et al., "Neural Adaptive Video Streaming with Pensieve", In ACM SIGCOMM, 2017, 14 pages.

Miller et al., "Optimal Adaptation Trajectories for Block-Request Adaptive Video Streaming", In IEEE Packet Video Norkshop, 2013, 8 pages.

Spiteri et al., "BOLA: Near-Optimal Bitrate Adaptation for Online Videos", In IEEE INFOCOM, Apr. 12, 2016, 12 pages.

Li et al., "Toward A Practical Perceptual Video Quality Metric", https://netflixtechblog.com/toward-a-practical-perceptual-video-quality-metric-653f208b9652, Jun. 6, 2016, 21 pages.

Yin et al., "A Control-Theoretic Approach for Dynamic Adaptive Video Streaming over HTTP", In ACM SIGCOMM, Aug. 17-21, 2015, 14 pages.

Mangla et al., "Video Through a Crystal Ball: Effect of Bandwidth Prediction Quality on Adaptive Streaming in Mobile Environments", DOI: http://dx.doi.org/10.1145/2910018.2910653. May 13, 2016, 6 pages.

* cited by examiner

TECHNIQUES FOR EVALUATING A VIDEO RATE SELECTION ALGORITHM BASED ON A GREEDY OPTIMIZATION OF TOTAL DOWNLOAD SIZE OVER A COMPLETED STREAMING SESSION

CROSS-REFERENCE TO RELATED APPLICATIONS

This application is a continuation of the co-pending U.S. patent application titled "TECHNIQUES FOR EVALUATING A VIDEO RATE SELECTION ALGORITHM BASED ON A GREEDY OPTIMIZATION OF TOTAL DOWNLOAD SIZE OVER A COMPLETED STREAMING SESSION," filed on Jul. 16, 2018 and having Ser. No. 16/036,606, which claims the benefit of U.S. Provisional Patent Application titled "ADAPTIVE BITRATE EVALUATION," filed on May 24, 2018 and having Ser. No. 62/676,246. The subject matter of these related applications is hereby incorporated herein by reference.

BACKGROUND

Field of the Various Embodiments

Embodiments of the present invention relate generally to streaming video technology and, more specifically, to techniques for evaluating a video rate selection algorithm over a completed streaming session.

Description of the Related Art

A typical video streaming service provides access to a library of media titles that can be viewed on a range of different client devices, where each client device usually connects to the video streaming service under different connection and network conditions. In many implementations, a client device that connects to a video streaming service executes an endpoint application. The endpoint application implements a video rate selection algorithm that attempts to optimize the visual quality experienced during playback of the media title on the client device while avoiding playback interruptions due to re-buffering events. In these types of implementations, for each source chunk of a media title, the video rate selection algorithm attempts to select the highest possible quality encoded version of the source chunk to stream to the client device based on the available network throughput.

In general, the overall quality of experience (QoE) that the video streaming service provides to viewers depends on the ability of the video rate selection algorithm to select a sequence of encoded chunks that optimizes visual quality without exceeding the available network throughput. Accordingly, being able to evaluate and fine-tune the performance of video rate selection algorithms across a range of intended operating scenarios is an important aspect of providing an effective video streaming service. The intended operating scenarios for a typical video streaming service include permutations across a wide range of network environments, device capabilities, video content complexities, etc.

In one approach to evaluating the performance of a video rate selection algorithm, a benchmark application retrospectively compares the performance of the video rate selection algorithm to the performance of an optimal video rate selection algorithm for numerous completed streaming sessions representing a range of operating scenarios. An optimal video rate selection algorithm identifies a sequence of encoded chunks that provides the best visual quality as measured via a QoE metric value without exceeding the available network throughput. For each of the completed streaming sessions, the benchmark application computes an optimal QoE metric value for a QoE metric based the optimal video rate selection algorithm and a recorded network throughout trace. The benchmark application then computes gaps between the actual QoE metric values achieved via the video rate selection algorithm and the optimal QoE metric values. Subsequently, the video streaming service provider investigates the gaps to identify operating scenarios during which the performance of the video rate algorithm is subpar. Finally, the video streaming service provider fine-tunes the video rate algorithm to improve the performance for the identified operating scenarios.

One drawback of this first approach is that optimal video rate selection is an NP-hard problem, where the abbreviation "NP" stands for non-deterministic polynomial time. As is well-understood, an NP-hard problem cannot be solved efficiently using known techniques. Because executing the optimal video rate selection algorithm for each completed streaming session is highly inefficient in view of the NP-hard problems, computing the numerous optimal QoE metric values required to comprehensively evaluate the video rate selection algorithm is usually prohibitively time consuming.

Given the above drawbacks, many video streaming service providers do not attempt to compare the performance of a video rate selection algorithm to the performance of an optimal video rate selection algorithm. Instead, in an effort to improve the performance of an existing, current video rate selection algorithm, a typical video streaming provider develops a new, candidate video rate selection algorithm. The candidate video rate selection algorithm executes faster than an optimal video rate selection algorithm, but provides sub-optimal visual quality. Subsequently, the video streaming service provider performs NB testing to compare the performance of the candidate video rate selection algorithm to the current video rate selection algorithm. In NB testing, two large groups of users are identified. Each group of users is associated with a representative mix of network environments and device capabilities. Group "A" receives the candidate video rate selection algorithm, while group "B" receives the current video rate selection algorithm. Over a period of time (e.g., a week), a comparison application collects and compares the "A" QoE metric values achieved via the candidate video rate selection algorithm to the "B" QoE metric values achieved via the current video rate selection algorithm. If the comparisons indicate that the candidate video rate selection algorithm outperforms the current video rate selection algorithm, then the video streaming service provider replaces the current video rate selection algorithm with the candidate video rate selection algorithm. In this fashion, the video streaming service provider is able to incrementally improve the performance of video streaming service.

One drawback of this second approach is that a current video rate selection algorithm in use as part of a video streaming service may perform reasonably well in many operating scenarios. Consequently, developing a candidate video rate selection algorithm that can outperform the current video rate selection algorithm can be a challenging, time-consuming, and primarily manual process. Further, if the candidate video rate selection algorithm fails to outperform the current video rate selection algorithm, then the process of comparing the candidate video selection algorithm to the current video rate selection algorithm provides no guidance on how to generate a new candidate video rate selection algorithm that actually outperforms the current video rate selection algorithm.

As the foregoing illustrates, more effective techniques for evaluating video rate selection algorithms are what is needed in the art.

SUMMARY

One embodiment of the present invention sets forth a computer-implemented method for evaluating one or more aspects of a video streaming service. The method includes computing a first feasible download end time associated with a source chunk of a media title based on a network throughput trace and a subsequent feasible download end time associated with a subsequent source chunk of the media title; selecting a first encoded chunk from a set of encoded chunks associated with the source chunk based on the network throughput trace, the first feasible download end time, and a preceding download end time associated with a preceding source chunk of the media title; and computing a total download size associated with a sequence of encoded chunks associated with the media title based on the number of encoded bits included in the first encoded chunk, where the performance of at least one aspect of a streaming video infrastructure is evaluated based on the total download size.

At least one technical advantage of the disclosed techniques relative to prior art solutions is that the disclosed techniques more efficiently determine an upper bound for the visual quality associated with a media title over a completed streaming session. In that regard, the disclosed techniques correlate the upper bound of visual quality to the total download size for a sequence of encoded chunks spanning the duration of the media title. Thus, the upper bound of visual quality can be determined by computing the total download size for the sequence of encoded chunks downloaded during playback of the media title, where each encoded chunk is comprised of a particular number of encoded bits. Notably, determining the total download size is computationally more efficient than prior art approaches that experience NP-hard problems. More specifically, unlike prior art approaches to computing an upper bound for visual quality that are NP-hard, the time required to compute the total download size using the disclosed techniques is on the order of the total number of source chunks making up the media title. Consequently, the time and computational resources required to evaluate the visual quality associated with a given video rate selection algorithm across a wide variety of network environments, device capabilities, and video content complexities using the disclosed techniques can be substantially reduced relative to prior art approaches. These technical advantages provide one or more technological advancements over the prior art.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
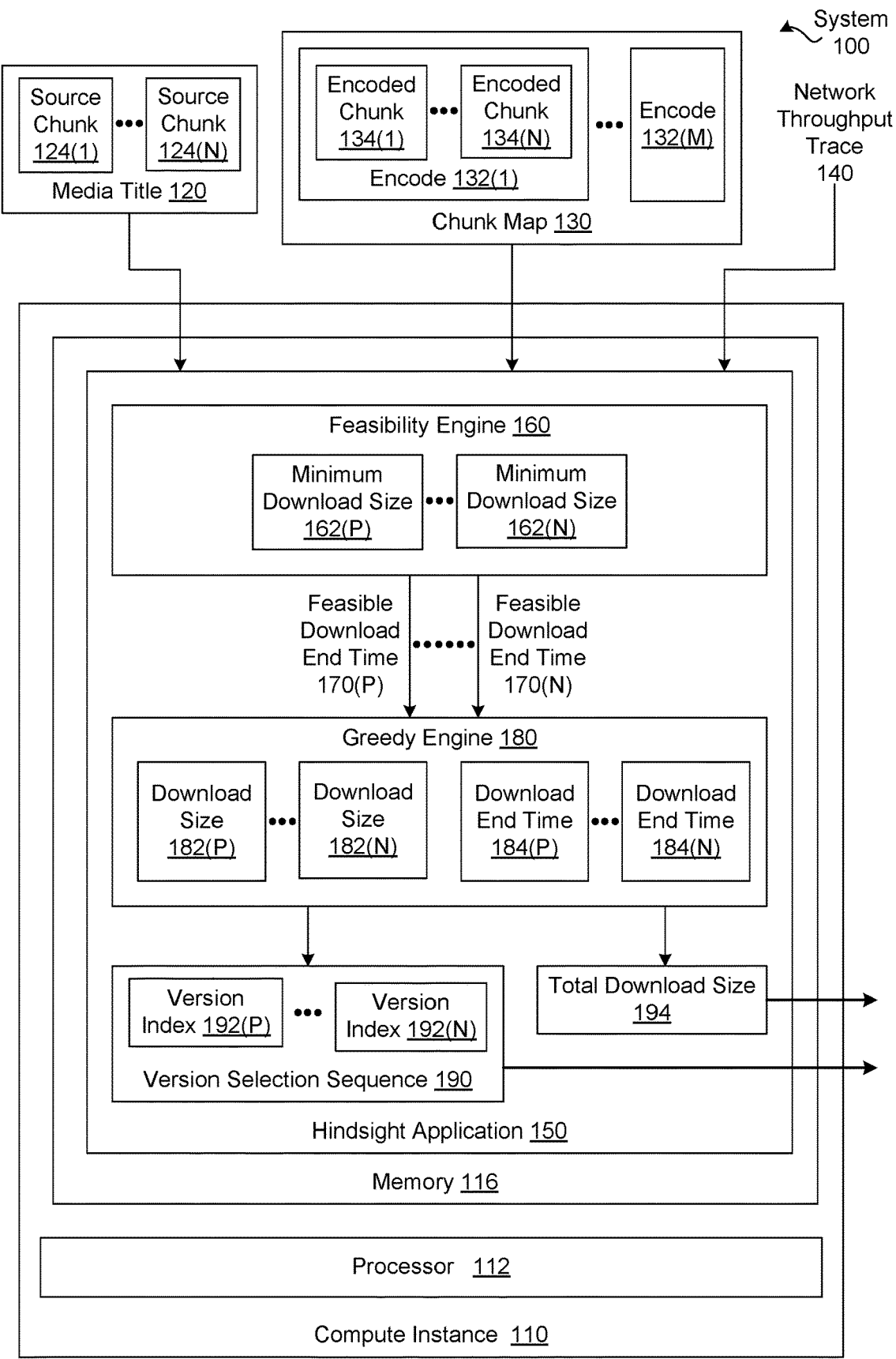
FIG. 1 is a conceptual illustration of a system configured to implement one or more aspects of the present invention.

In the following description, numerous specific details are set forth to provide a more thorough understanding of the present invention. However, it will be apparent to one of skilled in the art that the present invention may be practiced without one or more of these specific details.

The overall visual experience that a video streaming service provides to viewers depends on the ability of a video rate selection algorithm operating on the user-side device to select a sequence of encoded chunks that optimizes visual quality from the user's perspective without exceeding the available network throughput. Therefore, being able to evaluate the efficacy of different video rate selection algorithms is an important factor in the video streaming service's ability to provide high-quality viewing experiences to customers. Prior art techniques for evaluating the performance of video rate selection algorithms are prohibitively time consuming or provide little or no guidance on how to improve a given video rate selection algorithm.

For example, some prior-art techniques involve comparing an optimal average visual quality obtained using an optimal video rate selection algorithm to the actual average visual quality obtained using a given video rate selection algorithm for numerous completed streaming sessions. The completed streaming sessions represent a wide range of intended operating scenarios, where each operating scenario is a different permutation of a network environment, device capability, video content complexity, etc. However, known techniques for computing the optimal average visual quality for each completed streaming session are NP-hard, where the abbreviation "NP" stands for non-deterministic polynomial time. As is well-understood, an NP-hard problem cannot be solved efficiently using known techniques. Because computing the optimized average visual quality for each completed streaming session is highly inefficient, using such techniques to evaluate the video rate selection algorithm is usually prohibitively time consuming.

To address this problem, the disclosed techniques compute an upper bound on the total number of bits that can be used to encode the video content viewed during a completed streaming session. Notably, the total number of bits that are used to encode the video content correlates to an average visual quality associated with that. Thus, by comparing the total number of bits that are used to encode the video content viewed during the completed streaming session to the upper bound on the total number of bits that can be used to encode that same video content, the disclosed techniques allow the video streaming service to efficiently gauge the effectiveness of a given video rate selection algorithm. Further, the video streaming service provider can perform this type of comparison across numerous completed streaming sessions to identify operating scenarios during which the performance of the video rate algorithm is subpar. Subsequently, the video streaming service provider can fine-tune the video rate selection algorithm to enhance the overall customer viewing experience for the identified operating scenarios going forward.

In some embodiments, a hindsight application includes, without limitation, a feasibility engine and a greedy engine. The feasibility engine sequentially processes each source chunk included in a media title in the reverse playback order. For the $n^{th}$ source chunk, the feasibility engine computes an $n^{th}$ feasible download end time that is the latest possible time that a download of the smallest encoded chunk derived from the $n^{th}$ source chunk can complete during an uninterrupted playback of the media title. In operation, for a given source chunk, the feasibility engine sets a feasible download end time equal to the earlier of a playback start time associated with the source chunk and a feasible download start time associated with the subsequent source chunk. The feasibility engine computes the "subsequent" feasible download start time based on the feasible download end time associated with the subsequent source chunk, the number of bits included in the smallest encoded chunk derived from the subsequence source chunk, and a network throughput trace associated with a completed streaming session.

The greedy engine then sequentially processes each source chunk included in the media title in the playback order. For each source chunk included in the media title, the greedy engine greedily selects an encoded chunk derived from the source chunk. The greedy engine selects the encoded chunk based on a download end time associated with the preceding source chunk, the feasible download end time associated with the source chunk, and the network throughput trace. More precisely, the greedy engine selects the largest encoded chunk derived from the source chunk that allows an uninterrupted playback of the media title. The greedy engine tracks the selected encoded chunks via a version selection sequence. After processing all of the source chunks, the greedy engine sums the total number of bits included in each of the selected encoded chunks to compute a total download size. The total download size is an upper bound on the total number of bits that can be used to encode that media title during the streaming session.

Advantageously, the hindsight application addresses various limitations of conventional techniques for evaluating video rate algorithms. In particular, the hindsight application efficiently determines an upper bound for the visual quality associated with a media title over a completed streaming session. In that regard, as noted above, the hindsight application correlates the upper bound of visual quality to the total download size. Because the time required for the hindsight application to compute the total download size is on the order of the total number of source chunks making up the media title, the time required to evaluate the visual quality associated with a given video rate selection algorithm across a wide variety of operating scenarios using the hindsight application can be substantially reduced relative to prior art approaches. For example, the time required to compute an upper bound on a visual quality score for a movie via the hindsight application could be on the order of thousands of times less than the time required to compute an upper bound of the visual quality score for the movie via an optimal video rate algorithm. In addition, the video streaming service provider can fine-tune the video rate selection algorithm to improve the performance based on the version selection sequence associated with the total download size.

System Overview

FIG. 1 is a conceptual illustration of a system 100 configured to implement one or more aspects of the present invention. As shown, the system 100 includes, without limitation, a compute instance 110. In alternative embodiments, the system 100 may include any number of compute instances 110. For explanatory purposes, multiple instances of like objects are denoted with reference numbers identifying the object and parenthetical numbers identifying the instance where needed. In various embodiments, any number of the components of the system 100 may be distributed across multiple geographic locations or included in one or more cloud computing environments (i.e., encapsulated shared resources, software, data, etc.) in any combination.

As shown, the compute instance 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instance 110 is configured to implement one or more applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

In particular, the compute instance 110 is configured to generate one or more evaluation criteria for an aspect of a video streaming service, such as a quality of a video rate selection algorithm or a quality of a transport (e.g., a network). A typical video streaming service provides access to a library of media titles that can be viewed on a range of different client devices, where each client device usually connects to the video streaming service under different connection and network conditions. In many implementations, a client device that connects to a video streaming service executes an endpoint application. The endpoint application implements a video rate selection algorithm that attempts to optimize the visual quality experienced during playback of the media title on the client device while avoiding playback interruptions due to re-buffering events. In these types of implementations, for each source chunk of a media title, the video rate selection algorithm attempts to select the highest possible quality encoded version of the source chunk to stream to the client device based on the available network throughput.

In general, the overall quality of experience (QoE) that the video streaming service provides to viewers depends on the ability of the video rate selection algorithm to select a sequence of encoded chunks that optimizes visual quality without exceeding the available network throughput. Accordingly, being able to evaluate and fine-tune the performance of video rate selection algorithms across a range of intended operating scenarios is an important aspect of providing an effective video streaming service. The intended operating scenarios for a typical video streaming service include permutations across a wide range of network environments, device capabilities, video content complexities, etc.

In one approach to evaluating the performance of a video rate selection algorithm, a benchmark application retrospectively compares the performance of the video rate selection algorithm to the performance of an optimal video rate selection algorithm for numerous completed streaming sessions representing a range of operating scenarios. An optimal video rate selection algorithm identifies a sequence of encoded chunks that provides the best visual quality as measured via a QoE metric value without exceeding the available network throughput. For each of the completed streaming sessions, the benchmark application computes an optimal QoE metric value for a QoE metric based the optimal video rate selection algorithm and a recorded network throughout trace. The benchmark application then computes gaps between the actual QoE metric values achieved via the video rate selection algorithm and the optimal QoE metric values. Subsequently, the video streaming service provider investigates the gaps to identify operating scenarios during which the performance of the video rate algorithm is subpar. Finally, the video streaming service provider fine-tunes the video rate algorithm to improve the performance for the identified operating scenarios.

One drawback of this first approach is that optimal video rate selection is an NP-hard problem, where the abbreviation "NP" stands for non-deterministic polynomial time. As is well-understood, an NP-hard problem cannot be solved efficiently using known techniques. Because executing the optimal video rate selection algorithm for each completed streaming session is highly inefficient in view of the NP-hard problems, computing the numerous optimal QoE metric values required to comprehensively evaluate the video rate selection algorithm is usually prohibitively time consuming.

Given the above drawbacks, many video streaming service providers do not attempt to compare the performance of a video rate selection algorithm to the performance of an optimal video rate selection algorithm. Instead, in an effort to improve the performance of an existing, current video rate selection algorithm, a typical video streaming provider develops a new, candidate video rate selection algorithm. The candidate video rate selection algorithm executes faster than an optimal video rate selection algorithm, but provides sub-optimal visual quality. Subsequently, the video streaming service provider performs NB testing to compare the performance of the candidate video rate selection algorithm to the current video rate selection algorithm. In NB testing, two large groups of users are identified. Each group of users is associated with a representative mix of network environments and device capabilities. Group "A" receives the candidate video rate selection algorithm, while group "B" receives the current video rate selection algorithm. Over a period of time (e.g., a week), a comparison application collects and compares the "A" QoE metric values achieved via the candidate video rate selection algorithm to the "B" QoE metric values achieved via the current video rate selection algorithm. If the comparisons indicate that the candidate video rate selection algorithm outperforms the current video rate selection algorithm, then the video streaming service provider replaces the current video rate selection algorithm with the candidate video rate selection algorithm. In this fashion, the video streaming service provider is able to incrementally improve the performance of video streaming service.

One drawback of this second approach is that a current video rate selection algorithm in use as part of a video streaming service may perform reasonably well in many operating scenarios. Consequently, developing a candidate video rate selection algorithm that can outperform the current video rate selection algorithm can be a challenging, time-consuming, and primarily manual process. Further, if the candidate video rate selection algorithm fails to outperform the current video rate selection algorithm, then the process of comparing the candidate video selection algorithm to the current video rate selection algorithm provides no guidance on how to generate a new candidate video rate selection algorithm that actually outperforms the current video rate selection algorithm.

Approximating the Visual Quality Associated with an Encoded Chunk

To address the above problems, the system 100 includes, without limitation, a hindsight application 150. The hindsight application 150 resides in the memory 116 and executes on the processor 112 in linear time. The hindsight application 150 implements greedy optimization techniques to generate a total download size 194 associated with a version selection sequence 190 based on a network throughput trace 140, a media title 120, and a chunk map 130 associated with the media title 120. The network throughput trace 140 indicates the available network bandwidth as a function of time over a completed streaming session.

As shown, the media title 120 is partitioned into N source chunks 124 of video content. The chunk map 130 includes, without limitation, M encodes 132, where each of the encodes 132 is a different encoded version of the media title 120. Each of the encodes 132 is partitioned into N encoded chunks 134, where each encoded chunk 134 includes encoded video content derived from the corresponding source chunk 124. As referred to herein, each of the encoded chunks 134 that is derived from a given source chunk 124 is associated with the source chunk 124. As persons skilled in the art will recognize, during a streaming session, the endpoint application may select and download different encoded chunks 134 of different encodes 132 in any combination. For example, the client application could consecutively download the encoded chunk 134(1) of the encode 132(5), the encoded chunk 134(2) of the encode 132(3), the encoded chunk 134(3) of the encode 132(1), etc. In alternate embodiments, the chunk map 130 may be specified in any technically feasible fashion.

Typically, one or more of the encoded chunks 134 are downloaded before the playback of the media title 120 begins. The encoded chunks 134(1)-134(P−1) that are downloaded before the playback of the media title 120 begins are also referred to herein as the "pre-buffered" encoded source chunks 134(1)-134(P−1). Further, the source chunks 124(1)-124(P−1) associated with the pre-buffered encoded chunks 134(1)-134(P−1) are also referred to herein as pre-buffered source chunks 124(1)-124(P−1). The remaining encoded chunks 134(P)-134(N) are also referred to herein as the "playback-buffered" encoded chunks 134(P)-134(N). Further, the source chunks 124(P)-124(N) associated with the playback-buffered encoded chunks 134(P)-134(N) are also referred to herein as playback-buffered source chunks 124(P)-124(N). For explanatory purposes only, the download of the source chunk 124(P) starts at the same time as the playback start time associated with the media title 120. In alternate embodiments, the download of the source chunk 124(P) may start at any technically feasible time, and the techniques described herein are modified accordingly.

The version selection sequence 190 specifies a sequence of playback-buffered encoded chunks 134 that could retrospectively be downloaded during the streaming session characterized by the network throughput trace 140 to enable uninterrupted playback of the media title 120. As shown, the version selection sequence 190 includes, without limitation, version indices 194(P)-194(N). The version index 192(n) is an integer m in the range of 1-M that specifies the encoded chunk 134(n) of the encode 132(m). For example, a version index 192(45) that is equal to 3 specifies the encoded chunk 134(45) of the encode 132(3). In this fashion, for each of the playback-buffered source chunks 124, the version selection sequence 190 specifies one of the encoded versions of the source chunk 124. In alternate embodiments, the version selection sequence 190 may be specified in any technically feasible fashion.

The total download size 194 is the total number of encoded video bits that are downloaded during playback of the media title 120 when the playback-buffered encoded chunks 134 specified via the version selection sequence 190 are streamed to a client device. As described in greater detail below, the hindsight application 150 greedily maximizes the total download size 194 while ensuring an uninterrupted playback of the media title 120. Notably, the execution time required to compute the total download size 194 is on the order of the total number of source chunks 124. And, as persons skilled in the art will recognize, because visual quality typically increases as the number of encoded video bits increases, the total download size 194 correlates to an upper bound for visual quality. Consequently, the execution time required to compute an upper bound for visual quality associated with the media title 120 is linear. Further, as part of greedily optimizing the total download size 194, the hindsight application 150 indirectly optimizes the version selection sequence 190 with respect to visual quality.

As shown, the hindsight application includes, without limitation, a feasibility engine 160 and a greedy engine 180. The feasibility engine 160 includes, without limitation, minimum download sizes 162(P)-162(N). Upon receiving the media title 120, the chunk map 130 and the network throughput trace 140, the feasibility engine 160 sequentially processes each of the playback-buffered source chunks 124 in the reverse playback order. The reverse playback order starts at the source chunk 124(N) and ends at the source chunk 124(P).

In general, for each playback-buffered source chunk 124, the feasibility engine 160 computes a feasible download end time 170. The feasible download end time 170 specifies the latest time at which a download of the associated playback-buffered encoded chunk 134 can end that allows an uninterrupted playback of the media title 120 during the streaming session characterized by the network throughput trace 140. Further, after processing the playback buffered source chunks 124, the feasibility engine 160 determines whether an uninterrupted playback of the media title 120 is possible during the streaming session characterized by the network throughput trace 140.

During an uninterrupted playback of the media title 120, for each of the source chunks 124(x), the associated playback-buffered encoded chunk 134(x) finishes downloading before the proceeding source chunks 124(1)-124(x−1) finish playing back. Consequently, the feasible download end time 170(x) associated with the source chunk 124(x) is the latest time that satisfies both of two different criteria. The first criterion is that the associated encoded chunk 134(x) finishes downloading prior to an associated download deadline (not shown in FIG. 1).

The download deadline associated with the source chunk 124(x) specifies the latest time for the encoded chunk 134(x) to finish downloading that allows an uninterrupted playback of the source chunk 124(x) itself. Consequently, the download deadline associated with the playback-buffered source chunk 124(x) is equal to the time at which the playback of the source chunk 124(x) begins during an uninterrupted playback of the media title 124. Accordingly, the download deadline associated with the source chunk 124(x) is equal to the following summation (1):

$$\sum_{i=1}^{x-1} \tau(i) \tag{1}$$

In summation (1), τ(i) is the playback duration of the source chunk 124(i). As persons skilled in the art will recognize, the playback duration τ(i) of a given encoded chunk 134(i) derived from a given source chunk 124(i) is equal to the playback duration of any other encoded chunk 134(i) derived from the source chunk 124(i).

The second criteria is that the bandwidth remaining after the encoded source chunk 134(x) finishes downloading is larger than the sum of the minimum download sizes 162(x+1)-162(N). For each of the source chunks 124(x), the feasibility engine 160 sets the associated minimum download size 162(x) equal to the number of encoded bits included in the smallest encoded chunk 134(x). For example, suppose that the chunk map 130 includes the three encodes 130(1)-130(3). Further, suppose that the number of encoded bits included in the encoded chunk 134(1) that is included in the encode 130(1) is smaller than both the number of encoded bits included in the encoded chunk 134(1) that is included in the encode 130(2) and the number of encoded bits included in the encoded chunk 134(1) that is included in the encode 130(3). In such a scenario, the feasibility engine 160 sets the minimum download size 162(1) equal to the number of encoded bits included in the encoded chunk 134(1) that is included in the encode 130(1).

To determine the latest time at which the download of the encoded chunk 134(x) can end that satisfies the second criteria, the feasibility engine 160 determines the feasible download start time (not shown in FIG. 1) associated with the source chunk 124(x+1). As referred to herein, the feasible download start time associated with the source chunk 124(x+1) is the latest time that a download of the smallest encoded chunk 134(x+1) can hard before the feasible download end time 170(x+1). The feasibility engine 160 may determine the feasible download start time associated with the source chunk 124(x+1) in any technically feasible fashion.

For instance, in some embodiments, the feasibility engine 160 calculates the time interval required to download the minimum download size 162(x+1) based on the network throughput 140, where the time interval spans from the feasible download start time associated with the source chunk 124(x+1) to the feasible download end time 170(x+1). More precisely, the feasibility engine 160 determines the time interval based on the area under the network throughput trace 140 ending at the feasible download end time 170(x+1) that is equal to the minimum download size 162(x+1).

In other embodiments, the feasibility engine 160 solves the following equation (2) for s to compute the feasible download start time associated with the source chunk 124(x+1):

$$\arg\max_s\{\int_s^{FDE(x+1)} T(t)dt \geq MDS(x+1)\} \quad (2)$$

In the equation (2), t is time, FDE(x+1) is the feasible download end time 170(x+1), T(t) is the network throughput trace 140, and MDS(x+1) is the minimum download size 162(x+1). Since the feasibility engine 160 processes the source chunks 124 in the reverse playback order, the feasibility engine 160 computes the feasible download end time 170(x+1) before computing the feasible download end time 170(x).

The feasibility engine 160 then combines the first criteria and the second criteria to compute the feasibility deadline 170(x). For instance, in some embodiments, the feasibility engine 160 solves the following equations (3) to compute the feasible download end time 170(x) associated with the source chunk 124(x):

if x==N:

FDE(x)=DD(x)

if x∈{P, . . . ,(N-1)}:

$$FDE(x)=\min\{DD(x), \arg\max_s\{\int_s^{FDE(x+1)} T(t)dt \geq MDS(x+1)\}\} \quad (3)$$

In summation (3), DD(x) is the download deadline associated with the source chunk 124(x). Note that if x is equal to N, then there is no subsequent source chunk 124(x+1), consequently, the feasibility deadline 170(x) is equal to the download deadline associated with the source chunk 124(x).

After computing the feasible download end times 170(P)-170(N), the feasibility engine 160 implements equation (2) to compute the feasible download start time associated with the source chunk 124(P). If the feasible download start time associated with the source chunk 124(P) is earlier than the playback start time associated with the media title 120, then the feasibility engine displays an error message, and the hindsight application 150 terminates. The error message indicates that uninterrupted playback of the media title 120 is not possible during the streaming session characterized by the network throughput trace 140.

As shown, the greedy engine 180 includes, without limitation, the download sizes 182(P)-182(N) and the download end times 184(P)-182(N). Upon receiving the feasible download end times 170(P)-170(N), the greedy engine 180 generates the version selection sequence 190 and the corresponding total download size 194. In general, the greedy engine 180 performs greedy optimization operations to generate the version selection sequence 180, More precisely, the greedy engine 180 sequentially processes each of the playback-buffered source chunks 124 in the playback order. For a given playback-buffered source chunk 124(x), the greedy engine 180 selects the largest associated encoded chunk 134(x) that allows uninterrupted playback of the media title 120 and then computes the download end time 184(x). The greedy engine 180 may select the largest associated encoded chunk 134(x) that allows uninterrupted playback of the media title 120 in any technically feasible fashion.

For instance, in some embodiments, the greedy engine 180 generates an availability window (not shown in FIG. 1) that spans from the download end time 184(x-1) to the feasible download end time 170(x). The greedy engine 180 then computes a maximum download size based on the network throughput trace 140, the download end time 184(x-1), and the feasible download end time 170(x). The maximum download size is the total number of encoded bits that can be included in the encoded chunk 134(x) that allows an uninterrupted playback of the media title 120. In other embodiments, the greedy engine 180 computes the maximum download size associated with the source chunk 124(x) based on the following integral (4):

$$\int_{DE(x-1)}^{FDE(x)} T(t)dt \quad (4)$$

In the integral (4), DE(x-1) is the download end time 182(x-1) associated with the source chunk 124(x-1). Note that the greedy engine 180 sets the download end time 182(P-1) equal to the playback start time associated with the media title 120.

After computing the maximum download size associated with the source chunk 124(x), the greedy engine 180 selects the largest encoded chunk 134(x) that is not larger than the maximum download size. The greedy engine 180 appends the version index 192 associated with the selected encoded chunk 134(x) to the version selection sequence 190. Subsequently, the greedy engine 180 sets the download size 182(x) equal to the total number of bits included in the selected encoded chunk 134(x) and computes the download end time 184(x). The greedy engine 180 may compute the download end time 184(x) in any technically feasible fashion.

For instance, in some embodiments, the greedy engine 180 computes a time interval required to download the selected encoded chunk 134(x), where the time interval spans from the download end time 184(x-1) to the download end time 184(x). To determine the time interval, the greedy engine 180 identifies an area under the network throughput trace 140 that is equal to the download size 182(x) and starts at the download end time 184(x-1).

In other embodiments, the greedy engine 180 solves the following equation (5) for e to compute the download end time 184(x):

$$\arg\min_e\{\int_{DE(x-1)}^e T(t)dt \geq DS(x)\} \quad (5)$$

In the equation (5), DS(x) is the download size 184(x).

After processing the chunk 134(N), the greedy engine 180 sums the download sizes 184(P)-184(N) to compute the total download size 194. As persons skilled in the art will recognize, visual quality typically increases as the number of encoded video bits increases. Accordingly, as the greedy engine 180 processes the source chunks 124, the greedy engine 180 optimizes the version selection sequence 190 for total download size and thus indirectly optimizes visual quality. Notably, as part of selecting a given encoded chunk 134, the greedy engine 180 attempts to consume any available bandwidth that is not consumed by the preceding encoded chunks 134. In this fashion, the greedy engine 180 greedily optimizes the overall visual quality and quality of experience (QoE) associated with the playback of the media title 120.

Subsequently, the greedy engine 180 transmits the total download size 194 and/or the version selection sequence 190 to an application or a device (e.g., a display device) for use in evaluating the performance of an aspect of a video streaming service. For instance, in some embodiments, a video streaming service provider could use the total download size 194 as an upper bound for visual quality to retroactively evaluate the performance of a rate selection algorithm. The video streaming service provider could also use the version selection sequence to fine-tune the rate selection algorithm. Because the hindsight engine 150 executes in linear time, the time and computational resources required to comprehensively evaluate the visual quality provided via a video rate selection algorithm over a wide variety of network environments, device capabilities, and video content complexities are significantly reduced compared to prior art techniques.

In some embodiments, the video streaming service provider evaluates the performance of one or more networks based on the total download size 194. For instance, the video streaming service provider could perform A/B testing using an "A" network and a "B" network. The hindsight engine 150 could compute the total download size 194 for a variety of "A" network throughput traces to determine "A" network utilizations. Similarly, the hindsight engine 150 could compute the total download sizes 194 for a variety of "B" network throughput traces 140 to determine "B" network utilizations. The hindsight engine 150 could then compare the "A" network utilizations to the "B" network utilizations.

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques outlined herein are applicable to retrospectively and greedily optimizing a total number of downloaded bits to estimate an upper bound on an overall visual quality over a completed streaming session.

Figure 2A:
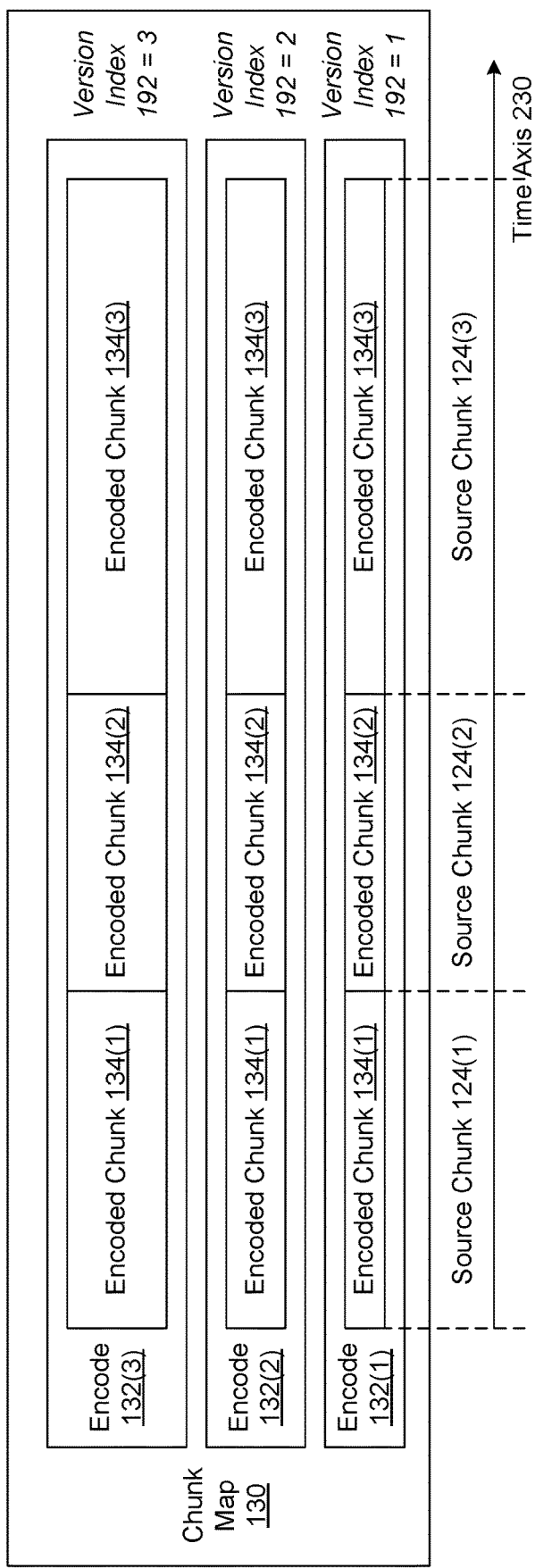
FIG. 2A illustrates an example of the chunk map of FIG. 1, according to various embodiments of the present invention.

FIG. 2A illustrates an example of the chunk map 130 of FIG. 1, according to various embodiments of the present invention. As shown, the media title 120 is partitioned into three source chunks 124(1)-124(3). For explanatory purposes, the playback duration of each of the three source chunks 124 is visually depicted along a time axis 230. The chunk map 130 includes, without limitation, the three encodes 132(1)-134(3). The encode 132(1) is associated with the version index 192 of 1, the encode 132(2) is associated with the version index 192 of 2, and the encode 132(3) is associated with the version index 192 of 3.

Each of the encodes 132 includes, without limitation, three different encoded chunks 134(1)-134(3). As described in conjunction with FIG. 1, the three encoded chunks 134(x) are all derived from the source chunk 124(x). Consequently, the playback duration associated with each of the encoded chunks 134(x) is equal to the playback duration of the source chunk 124(x) irrespective of the encode 132 that includes the encoded chunk 134(x). For example, the three encoded chunks 134(2) are derived from the source chunk 124(2). Consequently, the playback duration associated with each of the encoded chunks 134(2) is equal to the playback duration of the source chunk 124(2).

Each of the encodes 132 is associated with a different bitrate. For explanatory purposes only, the encode 132(3) is associated with a higher bitrate than the encode 132(2), and the encode 132(2) is associated with a higher bitrate than the encode 132(1). Consequently, the total number of encoded bits included in a given encode 132 is different from the total number of encoded bits included in either of the other encodes 132. For each of the encodes 132, the vertical extent of the boxes in the corresponding row depicted in FIG. 2A reflects the total number of encoded bits associated with the encode 132. In some embodiments, each of the encoded chunks 134 included in a given encode 132 may be associated with a different bitrate.

Although not shown, as persons skilled in the art will recognize, the visual quality of each of the encoded chunks 134 typically varies from the visual quality of the other encoded chunks 134. For instance, the visual quality of a particular encoded chunk 134(x) typically increases as the bitrate increases and typically decreases as the complexity of the associated source chunk 124(x) increases.

Figure 2B:
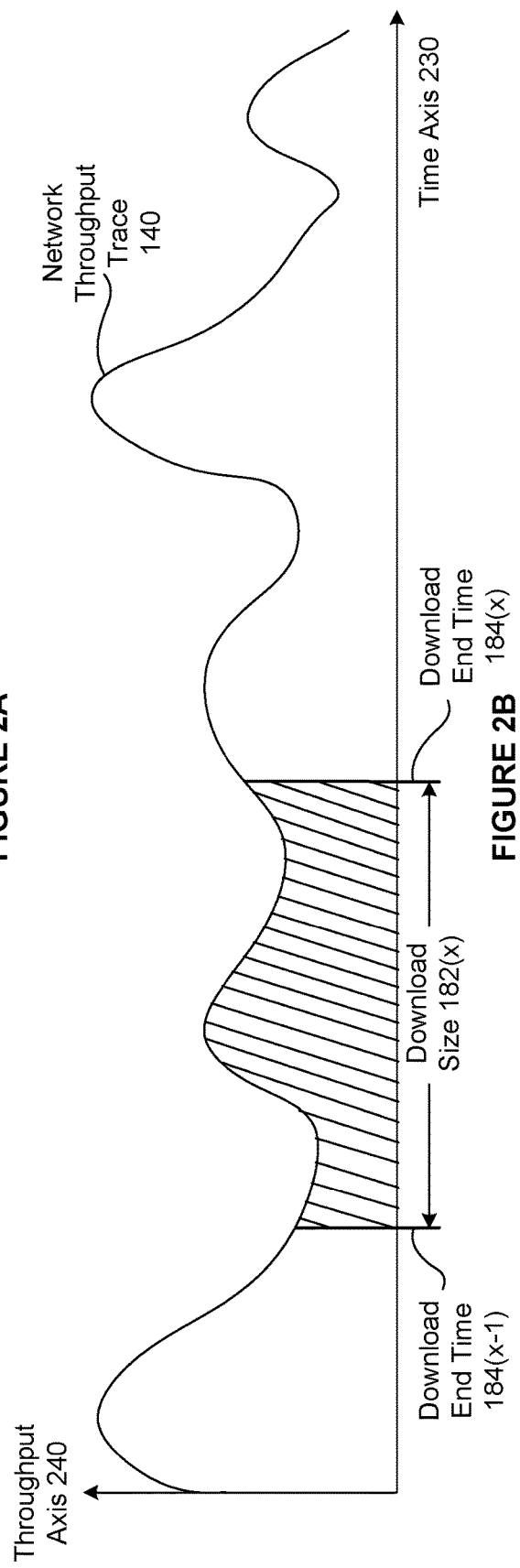
FIG. 2B illustrates an example of the network throughput trace of FIG. 1, according to various embodiments of the present invention.

FIG. 2B illustrates an example of the network throughput trace 140 of FIG. 1, according to various embodiments of the present invention. The value of the network throughput trace 140 at any given time along the time axis 230 is depicted along a throughput axis 240. As described in conjunction with FIG. 1, after selecting the playback-buffered encoded chunk 134(x), the greedy engine 180 determines the download end time 184(x) based on the network throughput trace 140, the download end time 184(x−1) and the download size 182(x). More specifically, the greedy engine 180 selects the download end time 184(x) such that the area (depicted with diagonal lines) under the network throughput trace 140 that resides between the download end time 184(x−1) and the download end time 184(x) is equal to the download size 182(x). As the network throughput trace 140 illustrates, the total amount of time required to download the encoded chunk 134(x) varies based on the download end time 184(x−1) and the download size 182(x).

Determining a Greedily Optimized Sequence of Encoded Chunks

Figure 3:
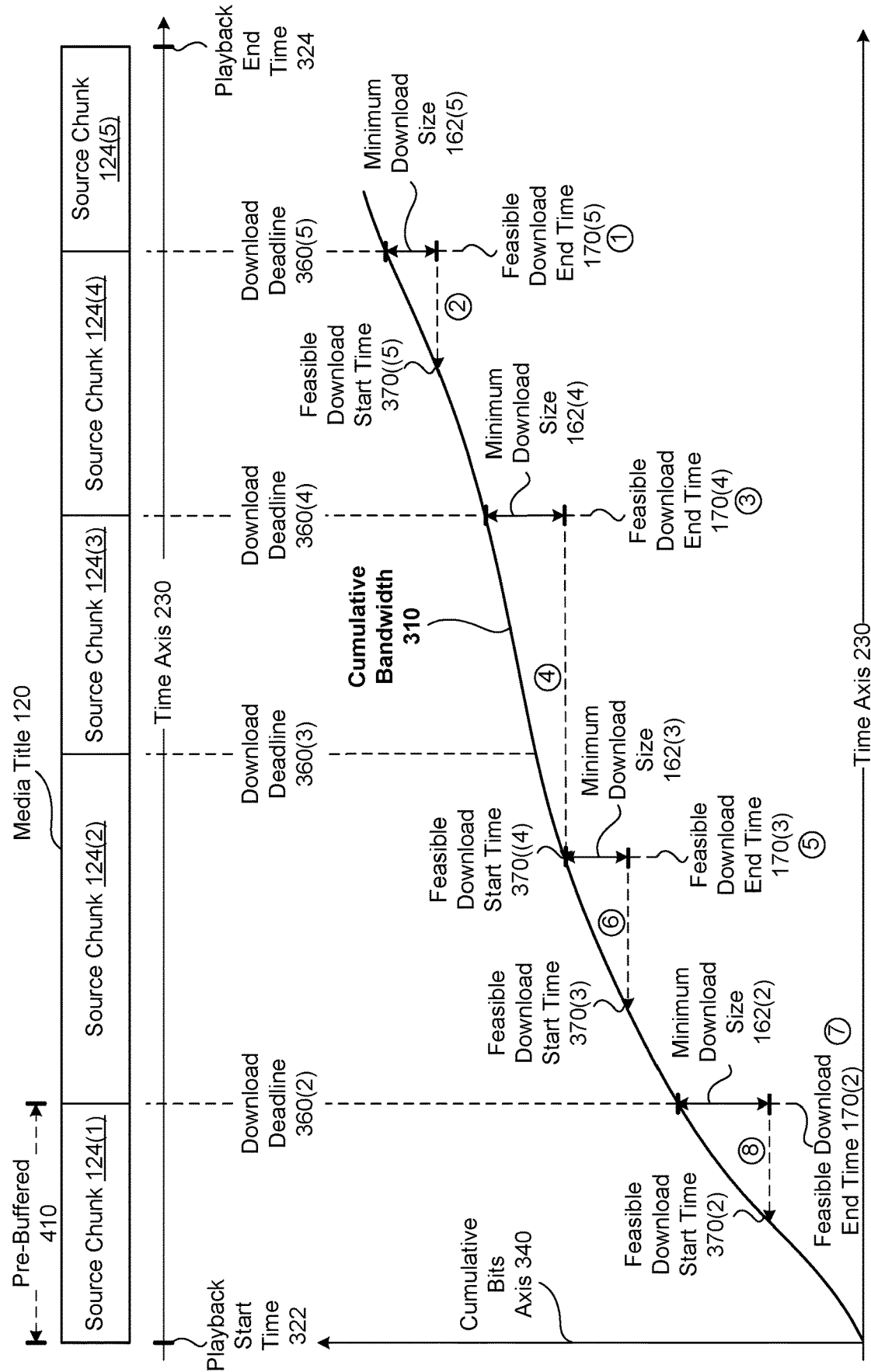
FIG. 3 illustrates how the feasibility engine of FIG. 1 computes a set of feasible download end times, according to various embodiments of the present invention.

FIG. 3 illustrates how the feasibility engine 160 of FIG. 1 computes a set of the feasible download end times 170(2)-170(5), according to various embodiments of the present invention. As shown, the media title 120 includes, without limitation, the pre-buffered source chunk 124(1) and the playback-buffered source chunks 124(2)-124(5). As marked on the time axis 230, a playback start time 322 indicates the time at which the pre-buffered source chunk 124(1) begins playing back. The playback of the media title 120 continues uninterrupted until the source chunk 124(5) finishing playing back, depicted as a playback end time 324.

For explanatory purposes only, FIG. 3 depicts a series of operations that the feasibility engine 160 performs to compute the feasible download end times 170(2)-170(5) as a series of numbered bubbles along a curve representing a cumulative bandwidth 310. At each time along the time axis 230, the associated point on the curve specifies the cumulative bandwidth along a cumulative bits axis 340. The cumulative bandwidth 310 is derived from the network throughput trace 140.

Initially, as depicted with the bubble numbered 1, because the source chunk 124(5) is the final source chunk 124 included in the media title 120, the feasibility engine 160 sets the feasible download end time 170(5) equal to a download deadline 360(5). In general, the download deadline 360(x) specifies the time at which the source chunk 124(x) begins to playback. As depicted with a dashed arrow and the bubble numbered 2, the feasibility engine 160 then computes a feasible download start time 370(5) based on the minimum download size 162(5) and the feasible download end time 170(5). As shown, the feasible download start time 370(5) is later than the download deadline 360(4). Consequently, as depicted with the bubble numbered 3, the feasibility engine 160 sets the feasible download end time 170(4) equal to the download deadline 360(4).

As depicted with a dashed arrow and the bubble numbered 4, the feasibility engine 160 then computes the feasible download start time 370(4) based on the minimum download size 162(4) and the feasible download end time 170(4). As shown, the feasible download start time 370(4) is earlier than the download deadline 360(3). Consequently, as depicted with the bubble numbered 5, the feasibility engine 160 sets the feasible download end time 170(3) equal to the feasible download start time 370(4).

Subsequently and as depicted with a dashed arrow and the bubble numbered 6, the feasibility engine 160 computes the feasible download start time 370(3) based on the minimum download size 162(3) and the feasible download end time 170(3). As shown, the feasible download start time 370(3) is later than the download deadline 360(2). Consequently, as depicted with the bubble numbered 7, the feasibility engine 160 sets the feasible download end time 170(2) equal to the download deadline 360(2). As depicted with a dashed arrow and the bubble numbered 8, the feasibility engine 160 then computes the feasible download start time 370(2) based on the minimum download size 162(2) and the feasible download end time 170(2).

Because the playback start time 322 is earlier than the feasible download start time 370(2), the feasibility engine 160 determines that an uninterrupted playback of the media title 120 is possible. Finally, to determine the version selection sequence 190 that greedily maximizes the total download size 194 while ensuring an uninterrupted playback, the feasibility engine 160 transmits the feasible download end times 170(2)-170(5) to the greedy engine 180.

Figure 4:
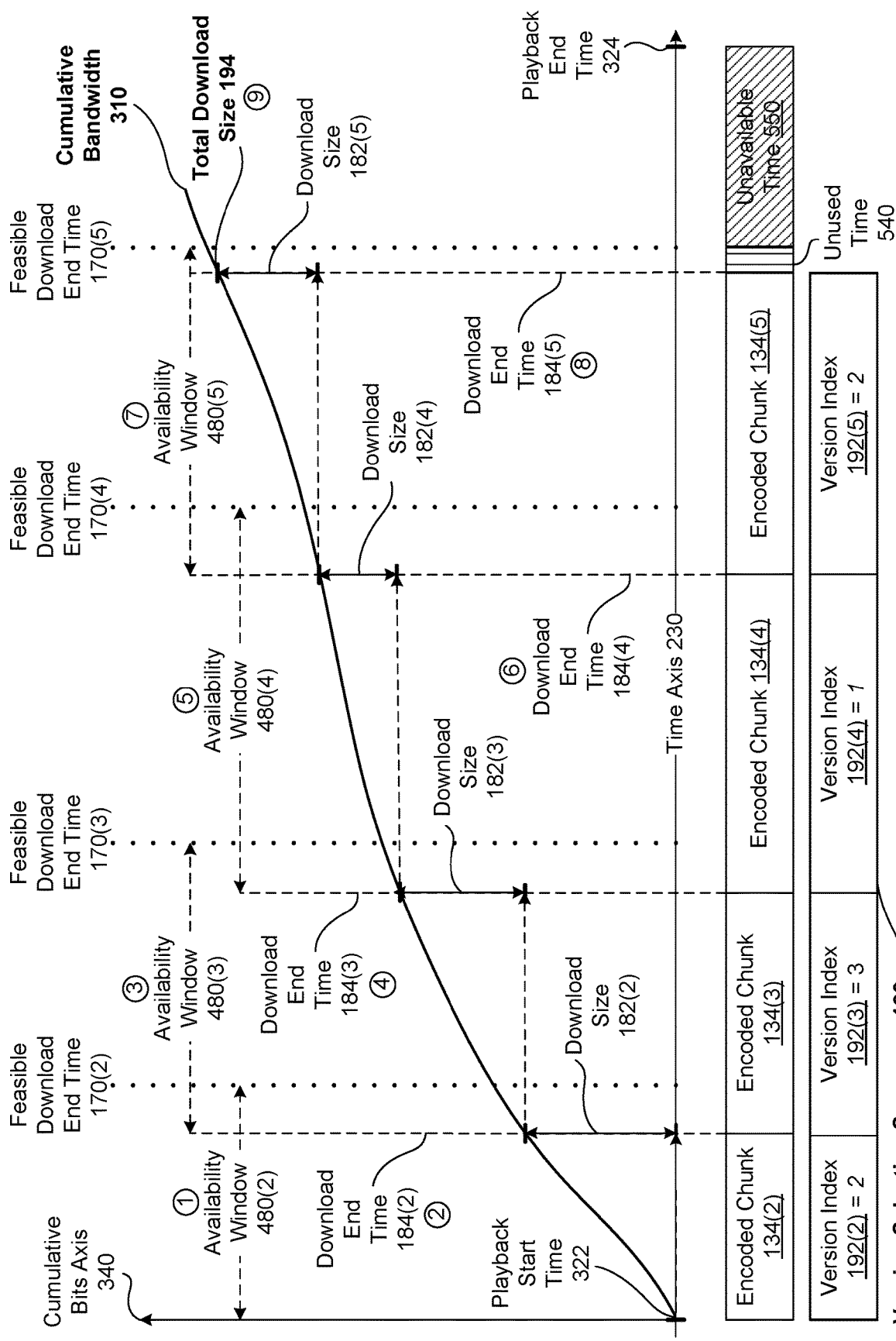
FIG. 4 illustrates how the greedy engine of FIG. 1 generates a version selection sequence, according to various embodiments of the present invention.

FIG. 4 illustrates how the greedy engine 180 of FIG. 1 generates the version selection sequence 190, according to various embodiments of the present invention. Although not shown in FIG. 4, the media title 120 includes, without limitation, the pre-buffered source chunk 124(1) and the playback-buffered source chunks 124(2)-124(5). Further, the chunk map 130 includes, without limitation, the three encodes 132(1)-134(3) corresponding version indexes 194 of, respectively, 1, 2, and 3. Each of the encodes 132 includes, without limitation, a different pre-buffered encoded chunk 134(1) and different playback-buffered encoded chunks 134(2)-134(5).

For explanatory purposes only, FIG. 4 depicts a series of operations that the greedy engine 180 performs to generate the version selection sequence 190 as a series of numbered bubbles along a curve representing the cumulative bandwidth 310. At each time along the time axis 230, the associated point on the curve specifies the cumulative bandwidth along the cumulative bits axis 340. The cumulative bandwidth 310 is derived from the network throughput trace 140.

Initially, as depicted with the bubble numbered 1, the greedy engine 180 generates an availability window 480(2) for the download of the encoded chunk 134(2). As shown, the availability window 480(2) spans from the playback start time 322 to the feasible download end time 170(2). The greedy engine 180 then selects the largest encoded chunk 134(2) that can download within the availability window 480(2), thereby allowing an uninterrupted playback of the media title 120.

Although not shown, the selected encoded chunk 134(2) is included in the encode 132(2) associated with the version index 192 of 2. Consequently, the greedy engine 180 sets the version index 192(2) included in the version selection sequence 190 equal to 2. The greedy engine 180 also sets the download size 182(2) equal to the number of bits included in the selected encoded chunk 134(2). As depicted with the bubble numbered 2, the greedy engine 180 then computes the download end time 184(2) based on the network throughput trace 140, the playback start time 322, and the download size 182(2).

Subsequently, as depicted with the bubble numbered 3, the greedy engine 180 generates the availability window 480(3) for the download of the encoded chunk 134(3). As shown, the availability window 480(3) spans from the download end time 184(2) to the feasible download end time 170(3). The greedy engine 180 then selects the largest encoded chunk 134(3) that can download within the availability window 480(3), thereby allowing an uninterrupted playback of the media title 120.

Although not shown, the selected encoded chunk 134(3) is included in the encode 132(3) associated with the version index 192 of 3. Consequently, the greedy engine 180 sets the version index 192(3) included in the version selection sequence 190 equal to 3. The greedy engine 180 also sets the download size 182(3) equal to the number of bits included in the selected encoded chunk 134(3). As depicted with the bubble numbered 4, the greedy engine 180 then computes the download end time 184(3) based on the network throughput trace 140, the download end time 184(2), and the download size 182(3).

As depicted with the bubble numbered 5, the greedy engine 180 then generates the availability window 480(4) for the download of the encoded chunk 134(4). The availability window 480(4) spans from the download end time 184(3) to the feasible download end time 170(4). The greedy engine 180 selects the largest encoded chunk 134(4) that can download within the availability window 480(4), thereby allowing an uninterrupted playback of the media title 120.

Although not shown, the selected encoded chunk 134(4) is included in the encode 132(1) associated with the version index 192 of 1. Consequently, the greedy engine 180 sets the version index 192(4) included in the version selection sequence 190 equal to 1. The greedy engine 180 also sets the download size 182(4) equal to the number of bits included in the selected encoded chunk 134(4). As depicted with the bubble numbered 6, the greedy engine 180 computes the download end time 184(4) based on the network throughput trace 140, the download end time 184(3) and the download size 182(4).

Subsequently and as depicted with the bubble numbered 7, the greedy engine 180 generates the availability window 480(5) for the download of the encoded chunk 134(5). As shown, the availability window 480(5) spans from the download end time 184(4) to the feasible download end time 170(5). The greedy engine 180 then selects the largest encoded chunk 134(5) that can download within the availability window 480(5), thereby allowing an uninterrupted playback of the media title 120.

Although not shown, the selected encoded chunk 134(5) is included in the encode 132(2) associated with the version index 192 of 2. Consequently, the greedy engine 180 sets the version index 192(5) included in the version selection sequence 190 equal to 2. The greedy engine 180 also sets the download size 182(5) equal to the number of bits included in the selected encoded chunk 134(5). As depicted with the bubble numbered 8, the greedy engine 180 computes the download end time 184(5) based on the network throughput trace 140, the download end time 184(4) and the download size 182(5).

Finally, as depicted with the bubble numbered 9, the greedy engine 180 sums the download sizes 182(2)-182(5) to compute the total download size 194. Advantageously, by greedily maximizing the total download size 194, the greedy engine 180 indirectly optimizes the overall visual quality associated with the version selection sequence 190. Further, the encoded chunks 134(2)-134(5) specified via the version selection sequence 190 allow an uninterrupted playback of the media title 120. Notably, there is a gap of unused time 540 between the time at which the download of the encoded chunk 134(5) completes and the time at which the playback of the encoded chunk 134(5) begins. The time following the time at which the playback of the encoded chunk 134(5) begins is depicted as unavailable time 550.

Figure 5A:
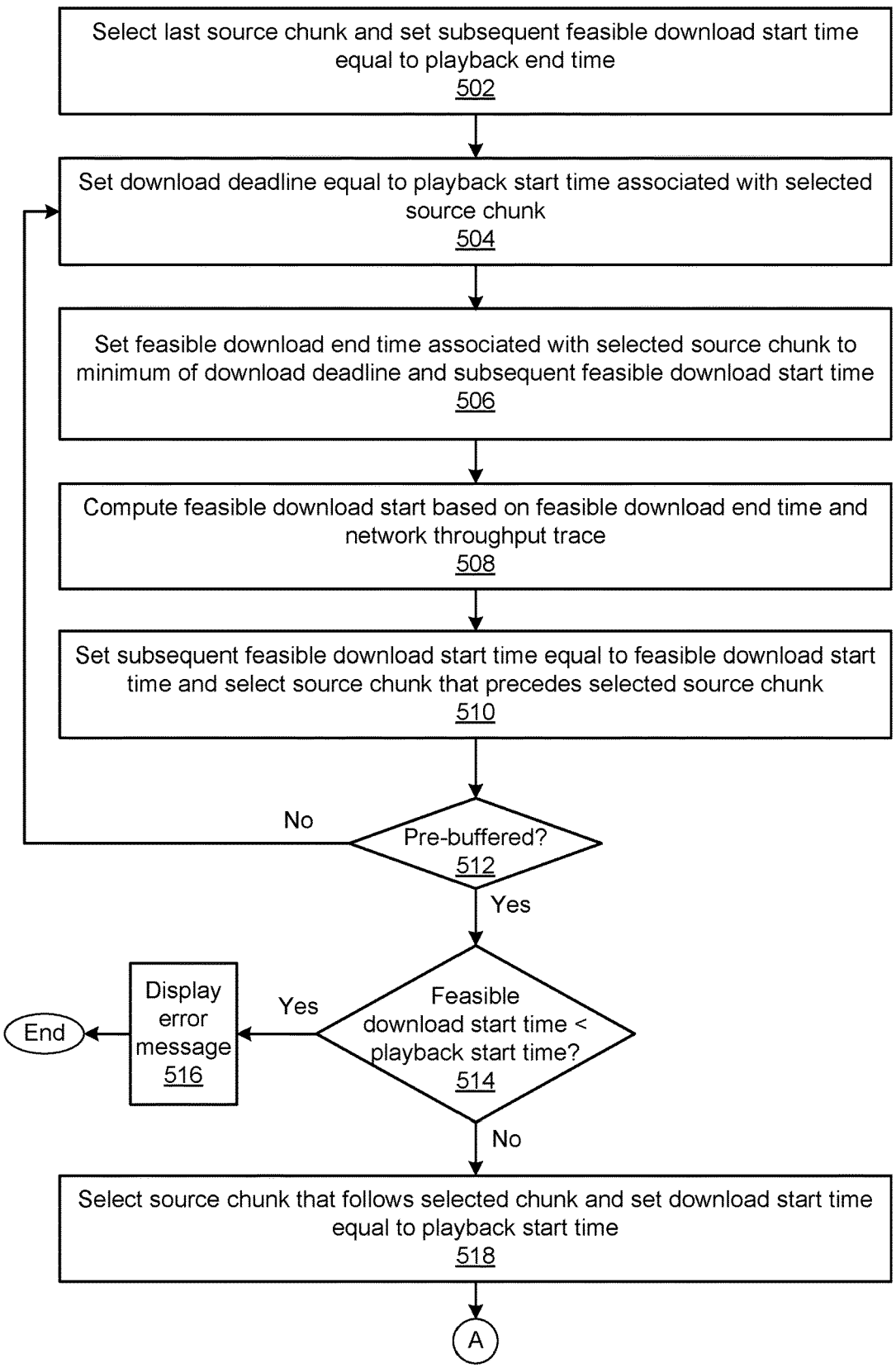
FIGS. 5A-5B set forth a flow diagram of method steps for evaluating one or more aspects of a video streaming service, according to various embodiments of the present invention.
Figure 5B:
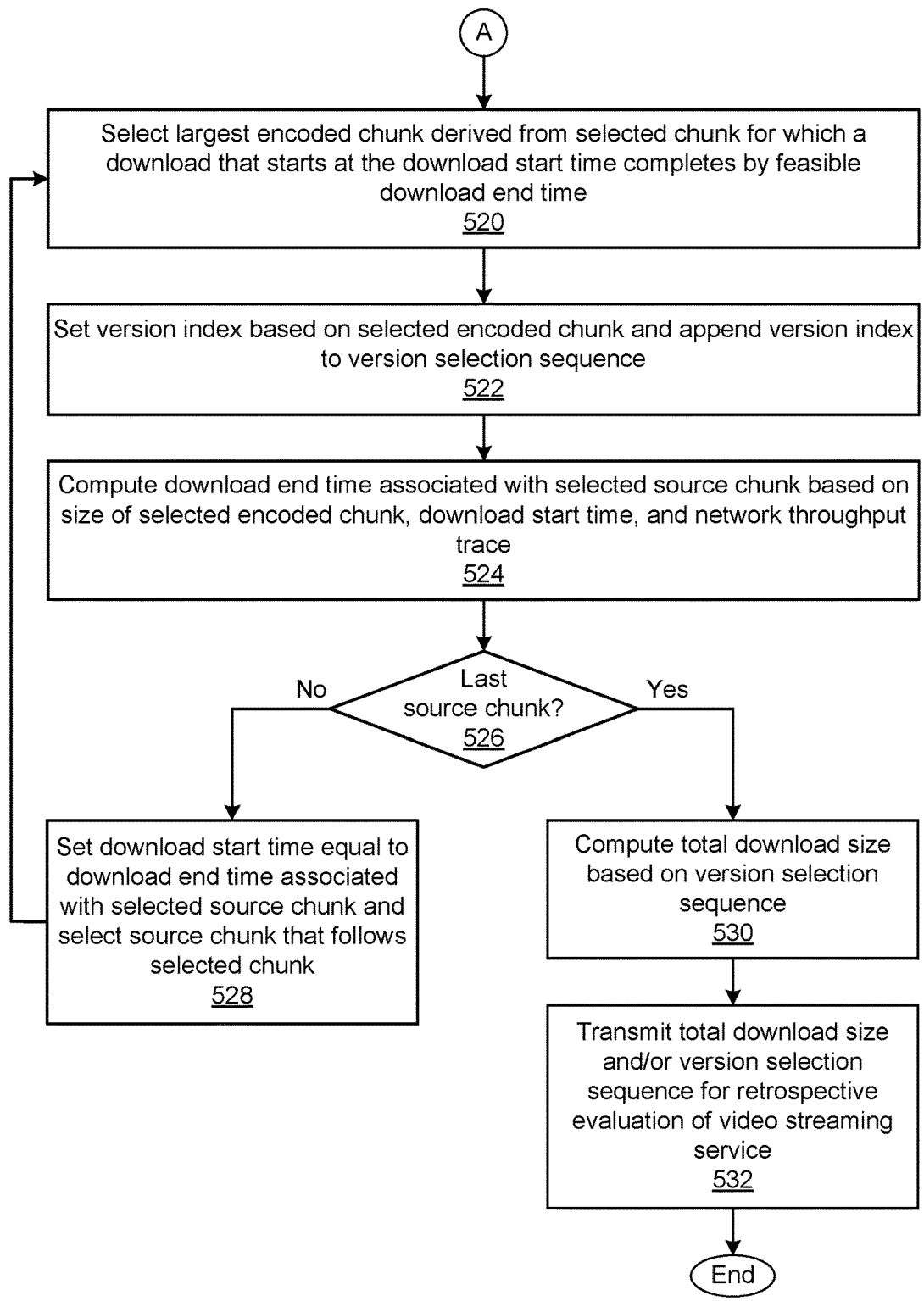

FIGS. 5A-5B set forth a flow diagram of method steps for evaluating one or more aspects of a video streaming service, according to various embodiments of the present invention. Although the method steps are described with reference to the systems of FIGS. 1-4, persons skilled in the art will understand that any system configured to implement the method steps, in any order, falls within the scope of the present invention.

As shown, a method 500 begins at step 502, where the feasibility engine 160 selects the last source chunk 124 included in a media title 120 and sets a subsequent feasible download start time equal to the playback end time 324, where the "subsequent feasible download start time" is a variable. At step 504, the feasibility engine 160 sets the download deadline 360 associated with the selected source chunk 124 equal to a playback start time associated with the selected source chunk 124 that ensures an uninterrupted playback of the media title 120. As persons skilled in the art will recognize, the playback start time associated with the selected source chunk 124 is independent of the version of the encoded chunk 134 that is downloaded.

At step 506, the feasibility engine 160 sets the feasible download end time 170 associated with the selected source chunk 124 equal to the minimum of the download deadline 360 and the subsequent feasible download start time. At step 508, the feasibility engine 160 computes the feasible download start time based on the feasible download end time 170 associated with the selected source chunk 124 and the network throughput trace 140. More precisely, the feasibility engine 160 selects the smallest encoded chunk 134 derived from the selected source chunk 124. The feasibility engine 160 then computes the feasible download start time for which a download of the selected encoded chunk 134 completes at the feasible download end time 170 associated with the selected source chunk 124.

At step 510, the feasibility engine 160 sets the subsequent feasible download start time equal to the feasible download start time and selects the source chunk 124 that precedes the selected source chunk 124 with respect to a playback of the media title 120. At step 512, the feasibility engine 160 determines whether the selected source chunk 124 is pre-buffered 512. If, at step 512, the feasibility engine 160 determines that the selected source chunk 124 is not pre-buffered, then the method 500 returns to step 504, where the feasibility engine 160 continues to process the source chunks 124 in the reverse playback order.

If, however, at step 512, the feasibility engine 160 determines that the selected source chunk 124 is pre-buffered, then the method 500 continues to step 514. At step 514, the feasibility engine 160 determines whether the feasible download start time is less than the playback start time 322. If, at step 514, the feasibility engine 160 determines that the feasible download start time is earlier than the playback start time 322, then the method 500 proceeds to step 516. At step 516, the feasibility engine 160 displays an error message, and the method 500 terminates.

If, however, at step 514, the feasibility engine 160 determines that the feasible download start time is not earlier than the playback start time 322, then the method 500 proceeds directly to step 518. At step 518, the greedy engine 180 selects the source chunk 124 that follows the selected source chunk 124 and sets a download start time equal to the playback start time 322. At step 520, the greedy engine 180 selects the largest encoded chunk 134 derived from the selected source chunk 124 for which a download of the encoded chunk 134 that starts at the download start time completes no later than the feasible download end time 170 associated with the selected source chunk 124. At step 522, the greedy engine 180 sets the version index 192 to specify the selected encoded chunk 134 and then appends the version index 192 to the version selection sequence 190.

At step 524, the greedy engine 180 computes the download end time 184 associated with the selected source chunk 124 based on the number of encoded bits included in the selected encoded chunk 134, the download start time, and the network throughput trace 140. At step 526, the greedy engine 180 determines whether the selected source chunk 124 is the last source chunk 124 included in the media title 120. If, at step 526, the greedy engine 180 determines that the selected source chunk 124 is not the last source chunk 124 included in the media title, then the method 500 proceeds to step 528. At step 528, the greedy engine 180 sets the download start time equal to the download end time 184 associated with the selected source chunk 124 and selects the source chunk 124 that follows the selected source chunk 124 with respect to the playback order. The method 500 then returns to step 520, where the greedy engine 180 continues to process the source chunks 124 in the playback order.

If, however, at step 526, the greedy engine 180 determines that the selected source chunk 124 is the last source chunk 124 included in the media title 120, then the method 500 proceeds directly to step 530. At step 530, the greedy engine 180 computes the total download size 194 that corresponds to the version selection sequence 190. At step 532, the greedy engine 180 transmits the total download size 194 and/or the version selection sequence 190 for retrospective evaluation of a video streaming service. In some embodiments, the total download size 194 and the version selection sequence 190 may be used to evaluate and fine-tune a rate selection algorithm. In the same or other embodiments, the total download size 194 may be used to evaluate the efficacy associated with the completed streaming session. Advantageously, the hindsight application 150 executes in linear time.

In sum, the disclosed techniques may be used to efficiently and reliably evaluate one or more aspects of a video streaming service based on a network throughput trace that characterizes a completed streaming session. A hindsight application includes, without limitation, a feasibility engine and a greedy engine. First, in reverse playback order for each playback-buffered source chunk included in a media title, the feasibility engine computes a feasible download end time based on a feasible download end time associated with the subsequent source chunk and the network throughput trace. More specifically, for a given source chunk, the feasibility engine selects the smallest encoded chunk derived from the subsequent source chunk. The feasibility engine then computes a "subsequent" feasible download start time based on the throughout trace, the feasible download end time associated with the subsequent source chunk, and the size of the selected encoded chunk. The feasibility engine then sets the feasible download end time associated with the source chunk equal to the earlier of the subsequent feasible download start time and the playback start time associated with the source chunk.

Second, in playback order for each playback-buffered source chunk included in the media title, the greedy engine selects an associated encoded chunk and computes an associated download end time. For a given source chunk, the greedy engine computes a maximum download size based on the network throughput trace, the associated feasible download end time, and a download end time associated with the preceding source chunk. The greedy engine then selects the largest encoded chunk derived from the source chunk that is not larger than the maximum download size. The greedy engine then appends the version index associated with the selected encoded chunk to a version selection sequence. Subsequently, the greedy engine computes the download end time associated with the source chunk based on the network throughput trace and, the size of the selected encoded chunk, and the "preceding" download end time. After processing all of the playback-buffered source chunks, the greedy engine sums the sizes of the encoded chunks specified via the version selection sequence to compute the total download size. The greedy engine then transmits the total download size and/or the version selection sequence to an application or a device (e.g., a display device) for use in evaluating the performance of an aspect of a video streaming service, such as a rate selection algorithm or a network.

At least one technical advantage of the disclosed techniques relative to prior art solutions is that the hindsight application more efficiently determines an upper bound for the visual quality associated with a media title over a completed streaming session. In that regard, the hindsight application correlates the upper bound of visual quality to the total download size. Notably, determining the total download size is computationally more efficient than prior art approaches that experience NP-hard problems. More specifically, unlike prior art approaches to computing an upper bound for visual quality that are NP-hard, the time required for the hindsight application to compute the total download size is on the order of the total number of source chunks making up the media title. Consequently, the time and computational resources required to evaluate the visual quality associated with a given video rate selection algorithm across a wide variety of network environments, device capabilities, and video content complexities using the hindsight application can be substantially reduced relative to prior art approaches. Further, the version selection sequence enables efficient fine-tuning of the video selection algorithm. Yet another advantage is that the disclosed techniques may be used to compare additional aspects of the video streaming service, such as the efficacy of a network. These technical advantages provide one or more technological advancements over the prior art.

1. In some embodiments, a computer-implemented method comprises computing a first feasible download end time associated with a source chunk of a media title based on a network throughput trace and a subsequent feasible download end time associated with a subsequent source chunk of the media title; selecting a first encoded chunk from a plurality of encoded chunks associated with the source chunk based on the network throughput trace, the first feasible download end time, and a preceding download end time associated with a preceding source chunk of the media title; and computing a total download size associated with a sequence of encoded chunks associated with the media title based on the number of encoded bits included in the first encoded chunk, wherein the performance of at least one aspect of a streaming video infrastructure is evaluated based on the total download size.

2. The computer-implemented method of clause 1, wherein computing the first feasible download end time comprises computing a subsequent feasible download start time based on the network throughput trace and the subsequent feasible download end time; determining that the subsequent feasible download start time is not earlier than a playback start time associated with the source chunk; and setting the first feasible download end time equal to the playback start time.

3. The computer-implemented method of clauses 1 or 2, wherein computing the first feasible download end time comprises computing a subsequent feasible download start time based on the network throughput trace and the subsequent feasible download end time; determining that the subsequent feasible download start time is earlier than a playback start time associated with the source chunk; and setting the first feasible download end time equal to the subsequent feasible download start time.

4. The computer-implemented method of any of clauses 1-3, wherein computing the subsequent feasible download start time comprises determining that a second encoded chunk comprises the smallest encoded chunk included in a plurality of encoded chunks associated with the subsequent source chunk; and calculating a time interval required to download the second encoded chunk based on the network throughput trace, wherein the time interval spans from the subsequent feasible download start time to the subsequent feasible download end time.

5. The computer-implemented method of any of clauses 1-4, further comprising calculating the time interval based on an integral of the network throughput trace with respect to time and the number of encoded bits included in the second encoded chunk.

6. The computer-implemented method of any of clauses 1-5, wherein selecting the first encoded chunk comprises generating an availability window that spans from the preceding download end time to the first feasible download end time; computing a maximum download size based on the network throughput trace and the availability window; determining that the first encoded chunk comprises the largest encoded chunk that is both included in the plurality of encoded chunks and is not larger than the maximum download size; and specifying that the first encoded chunk is included in the sequence of encoded chunks.

7. The computer-implemented method of any of clauses 1-6, wherein computing the maximum download size comprises calculating an area under the network throughput trace, wherein the area corresponds to the availability window.

8. The computer-implemented method of any of clauses 1-7, further comprising determining the sequence of encoded chunks based on the selection of the first encoded chunk, wherein the performance of the at least one aspect of the streaming video infrastructure is further evaluated based on the sequence of encoded chunks.

9. The computer-implemented method of any of clauses 1-8, wherein each encoded chunk included in the plurality of encoded chunks is associated with a different level of visual quality.

10. The computer-implemented method of any of clauses 1-9, wherein the one or more aspects of the streaming video infrastructure comprises at least one of an efficacy of a video rate selection algorithm and an efficacy of a network.

11. In some embodiments, a non-transitory computer-readable storage medium includes instructions that, when executed by a processor, cause the processor to perform the steps of computing a first feasible download end time associated with a source chunk of a media title based on a network throughput trace and a subsequent feasible download end time associated with a subsequent source chunk of the media title; selecting a first encoded chunk from a plurality of encoded chunks associated with the source chunk based on the network throughput trace, the first feasible download end time, and a preceding download end time associated with a second encoded chunk, wherein the second encoded chunk is associated with a preceding source chunk of the media title; determining a sequence of encoded chunks associated with the media title based on the selection of the first encoded chunk and a selection of the second encoded chunk; and computing a total download size associated with the sequence of encoded chunks based on the number of encoded bits included in the first encoded chunk, wherein the performance of at least one aspect of a streaming video infrastructure is evaluated based on the total download size.

12. The non-transitory computer-readable storage medium of clause 11, wherein computing the first feasible download end time comprises computing a subsequent feasible download start time based on the network throughput trace and the subsequent feasible download end time; determining that the subsequent feasible download start time is not earlier than a playback start time associated with the source chunk; and setting the first feasible download end time equal to the playback start time.

13. The non-transitory computer-readable storage medium of clauses 11 or 12, wherein computing the first feasible download end time comprises computing a subsequent feasible download start time based on the network throughput trace and the subsequent feasible download end time; determining that the subsequent feasible download start time is earlier than a playback start time associated with the source chunk; and setting the first feasible download end time equal to the subsequent feasible download start time.

14. The non-transitory computer-readable storage medium of any of clauses 11-13, wherein computing the subsequent feasible download start time comprises determining that a third encoded chunk comprises the smallest encoded chunk included in a plurality of encoded chunks associated with the subsequent source chunk; and calculating a time interval required to download the third encoded chunk based on the network throughput trace, wherein the time interval spans from the subsequent feasible download start time to the subsequent feasible download end time.

15. The non-transitory computer-readable storage medium of any of clauses 11-14, further comprising computing an area under the network throughput trace to calculate the time interval, wherein the area is equal to the number of encoded bits included in the third encoded chunk.

16. The non-transitory computer-readable storage medium of any of clauses 11-15, wherein selecting the first encoded chunk comprises generating an availability window that spans from the preceding download end time to the first feasible download end time; computing a maximum download size based on the network throughput trace and the availability window; determining that the first encoded chunk comprises the largest encoded chunk that is both included in the plurality of encoded chunks and is not larger than the maximum download size; and specifying that the first encoded chunk is included in the sequence of encoded chunks.

17. The non-transitory computer-readable storage medium of any of clauses 11-16, wherein determining the maximum download size comprises calculating an integral of the network throughput trace over the availability window.

18. The non-transitory computer-readable storage medium of any of clauses 11-17, wherein each encoded chunk included in the plurality of encoded chunks is associated with a different bitrate.

19. The non-transitory computer-readable storage medium of any of clauses 11-18, wherein the one or more aspects of the streaming video infrastructure comprises at least one of an efficacy of a video rate selection algorithm and an efficacy of a network.

20. In some embodiments, a system comprises a memory storing instructions; and a processor that is coupled to the memory and, when executing the instructions, is configured to compute a first feasible download end time associated with a source chunk of a media title based on a network throughput trace and a subsequent feasible download end time associated with a smallest encoded chunk included in a plurality of encoded chunks associated with a subsequent source chunk; select a first encoded chunk from a plurality of encoded chunks associated with the source chunk based on the network throughput trace, the first feasible download end time, and a preceding download end time associated with a second encoded chunk, wherein the second encoded chunk is associated with a preceding source chunk of the media title; and compute a total download size associated with a sequence of encoded chunks of the media title based on the number of encoded bits included in the first encoded chunk and the number of encoded bits included in the second encoded chunk, wherein the performance of at least one aspect of a streaming video infrastructure is evaluated based on the total download size.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for streaming a media title, the method comprising:
   selecting, via a video rate selection algorithm, a first encoded chunk associated with the media title based on a current network throughput, wherein the video rate selection algorithm is configured according to an upper bound for visual quality that is computed using a plurality of feasible download end times that are associated with a plurality of chunks of the media title, wherein the plurality of feasible download end times are determined prior to streaming the plurality of chunks; and
   requesting the first encoded chunk from a server machine for playback.

2. The computer-implemented method of claim 1, wherein the plurality of feasible download end times includes a first feasible download end time associated with a given source chunk of a second media title and a subsequent feasible download end time associated with a subsequent source chunk of the second media title, and the first feasible download end time is computed based on a given network throughput and the subsequent feasible download end time.

3. The computer-implemented method of claim 2, wherein the first feasible download end time is computed based on a subsequent feasible download start time computed using the given network throughput and the subsequent feasible download end time.

4. The computer-implemented method of claim 3, wherein the first feasible download end time is further based on the subsequent feasible download start time being earlier than a playback start time associated with the given source chunk, and the first feasible download end time being set equal to the subsequent feasible download start time.

5. The computer-implemented method of claim 3, wherein the first feasible download end time is further based on the subsequent feasible download start time not being earlier than a playback start time associated with the given source chunk, and the first feasible download end time being set equal to the playback start time.

6. The computer-implemented method of claim 1, wherein the video rate selection algorithm is further configured according to a total download size associated with a sequence of encoded chunks of a second media title, wherein the total download size is computed based on a number of encoded bits included in a particular encoded chunk of the second media title associated with a particular source chunk of the second media title.

7. The computer-implemented method of claim 1, wherein the video rate selection algorithm is further configured according to a particular encoded chunk of the media title that is included in a plurality of encoded chunks of the media title, wherein the plurality of encoded chunks is associated with a particular source chunk of the media title, and each encoded chunk included in the plurality of encoded chunks is associated with a different level of visual quality.

8. The computer-implemented method of claim 1, wherein the video rate selection algorithm is further configured according to a particular encoded chunk of a second the media title, wherein the particular encoded chunk comprises a largest encoded chunk that is less than or equal to a maximum download size, wherein the maximum download size is computed based on a given network throughput and an availability window.

9. One or more non-transitory computer-readable media storing instructions that are associated with a video rate selection algorithm, wherein, when the instructions are executed by at least one processor, the instructions cause the at least one processor to perform the steps of:
   selecting a first encoded chunk associated with a media title based on a current network throughput; and
   requesting the first encoded chunk from a server machine for playback,
   wherein the video rate selection algorithm is configured according to an upper bound for visual quality that is computed using a plurality of feasible download end times that are associated with a plurality of chunks of the media title, wherein the plurality of feasible download end times are determined prior to streaming the plurality of chunks.

10. The one or more non-transitory computer-readable media of claim 9, wherein the plurality of feasible download end times includes a first feasible download end time associated with a given source chunk of a second media title and a subsequent feasible download end time associated with a subsequent source chunk of the second media title, and the first feasible download end time is computed based on a given network throughput and the subsequent feasible download end time.

11. The one or more non-transitory computer-readable media of claim 10, wherein the first feasible download end time is computed based on a subsequent feasible download start time computed using the given network throughput and the subsequent feasible download end time.

12. The one or more non-transitory computer-readable media of claim 11, wherein the first feasible download end time is further based on the subsequent feasible download start time being earlier than a playback start time associated with the given source chunk, and the first feasible download end time being set equal to the subsequent feasible download start time.

13. The one or more non-transitory computer-readable media of claim 11, wherein the first feasible download end time is further based on the subsequent feasible download start time not being earlier than a playback start time associated with the given source chunk, and the first feasible download end time being set equal to the playback start time.

14. The one or more non-transitory computer-readable media of claim 9, wherein the video rate selection algorithm is further configured according to a total download size associated with a sequence of encoded chunks of a second media title, wherein the total download size is computed based on a number of encoded bits included in a particular encoded chunk of the second media title associated with a particular source chunk of the second media title.

15. The one or more non-transitory computer-readable media of claim 9, wherein the video rate selection algorithm is further configured according to a particular encoded chunk of the media title that is included in a plurality of encoded chunks of the media title, wherein the plurality of encoded chunks is associated with a particular source chunk of the media title, and each encoded chunk included in the plurality of encoded chunks is associated with a different level of visual quality.

16. The one or more non-transitory computer-readable media of claim 9, wherein the video rate selection algorithm is further configured according to a particular encoded chunk of as second media title, wherein the particular encoded chunk comprises a largest encoded chunk that is less than or equal to a maximum download size, wherein the maximum download size is computed based on a given network throughput and an availability window.

17. A computer-implemented method for evaluating one or more aspects of a streaming infrastructure, the method comprising:
    selecting a first encoded chunk from a plurality of different encoded versions of a given source chunk of a media title based on a network throughput, a first feasible download end time associated with the given source chunk of the media title, and a preceding download end time associated with a preceding source chunk of the media title; and
    computing a total download size associated with a sequence of encoded chunks associated with the media title based on a number of encoded bits included in the first encoded chunk.

18. The computer-implemented method of claim 17, further comprising computing the first feasible download end time associated with the given source chunk of the media title based on the network throughput and a subsequent feasible download end time associated with a subsequent source chunk of the media title.

19. The computer-implemented method of claim 17, wherein each encoded chunk included in the plurality of different encoded versions encoded chunks is associated with a different level of visual quality.

20. The computer-implemented method of claim 17, further comprising:
    generating an availability window that spans from the preceding download end time to the first feasible download end time:
    computing a maximum download size based on the network throughput and the availability window;
    determining that the first encoded chunk comprises a largest encoded chunk that is both included in the plurality of different encoded versions and is not larger than the maximum download size; and
    specifying that the first encoded chunk is included in the sequence of encoded chunks.

* * * * *